Jan. 1, 1952     F. M. ARCHIBALD     2,581,064
TREATING OIL WITH SULFUR TRIOXIDE
Filed June 5, 1948
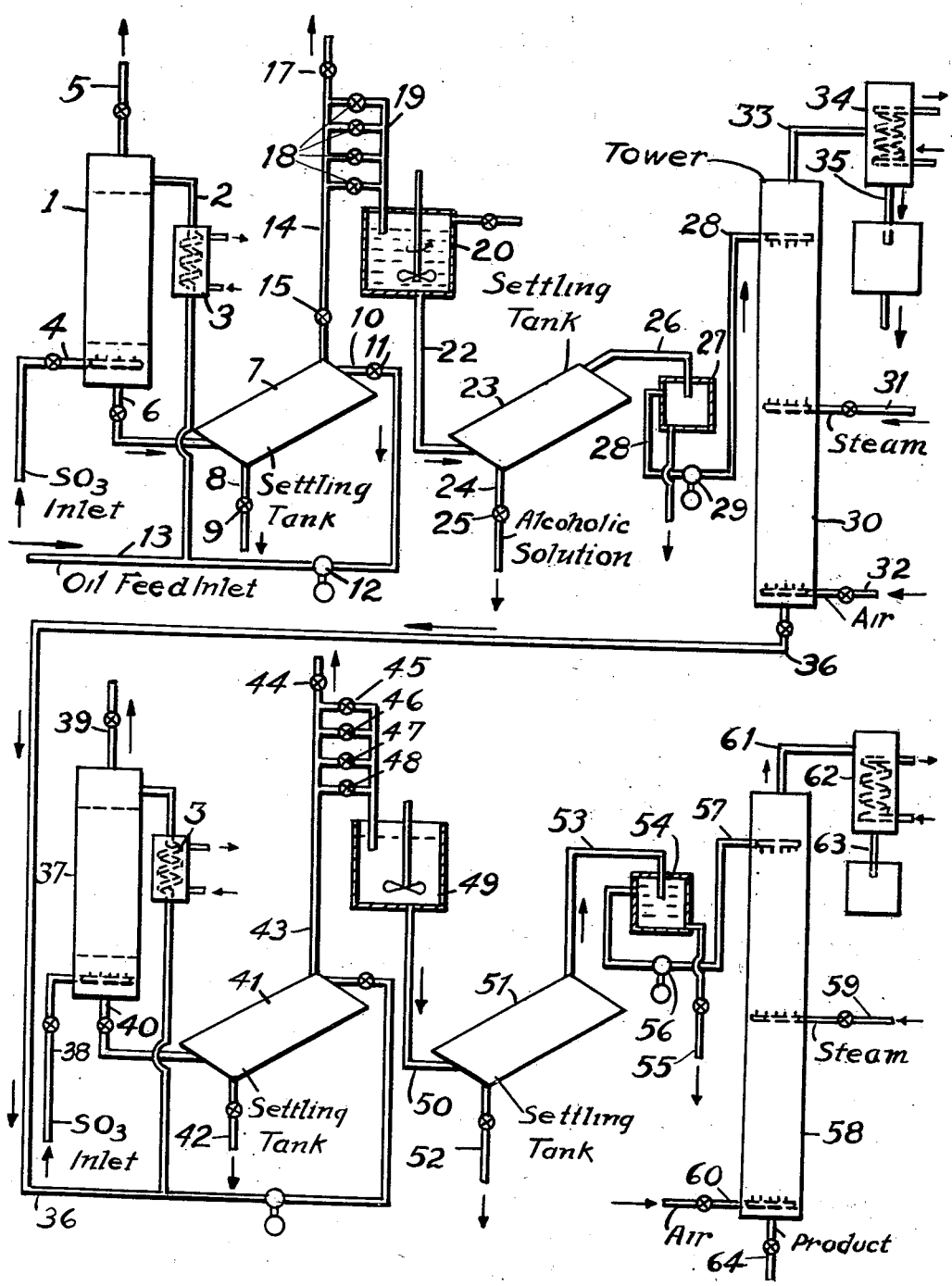
Francis M. Archibald Inventor
By W. O. T Heilman Attorney Patented Jan. 1, 1952

2,581,064

UNITED STATES PATENT OFFICE 2,581,064

TREATING OIL WITH SULFUR TRIOXIDE

Francis M. Archibald, Elizabeth, N. J., assignor to Standard Oil Development Company, a corporation of Delaware Application June 5, 1948, Serial No. 31,295

2 Claims. (Cl. 196—40)

This invention relates to improvements in treating oils with reagents producing a viscous precipitate which becomes progressively less viscous as the treatment is completed. It relates particularly to the treatment of viscous petroleum oils with sulphur trioxide.

Petroleum and also fatty oils of both animal and vegetable origin have in the past been treated with various strengths of sulfuric acid, chlorosulfonic acid, etc., to refine it of constituents or impurities which react with these acids and form an insoluble precipitate of a viscous nature. The precipitate commonly termed acid sludge or more briefly, sludge coagulates from the agitated acid and oil emulsion and settles to the bottom of the vessel after the agitation has been suspended and the treated oil is withdrawn as the supernatant layer. The important features for good chemical efficiency and product quality are to have good temperature control during the reaction, intimate contact with the reagent during the treating process. The separation of the sludge following the treating process should also be complete and is preferably carried out in the absence of any substantial agitation. For reasons of operating efficiency, a fluid sludge is highly desirable. Otherwise the equipment must include mechanical scraping and unloading devices which are expensive to maintain and operate or the equipment must be completely shut down and manual labor used to clean and recondition the vessels before further settling operations can be carried out.

An object of this invention is to provide a method whereby the sludge or precipitated acid reaction products may readily separate and remain in a fluid state. The process applies generally to treating processes where the reagent is added in stages and where the precipitated product is most viscous in the first stages. It has been found that in later stages the sludge is not only more fluid, but is miscible with the earlier sludge and increases its fluidity. When, however, the treating is carried out under conditions that some of the later stage treating occurs concurrently with the early stage treating in the same mixture there is a further fluidization of the resulting sludge. This is achieved by a recycle operation which incidentally provides a stream to be cooled and led into the reaction zone to control the reaction temperature.

The specific application has been found in the use of a dilute sulphur trioxide gas in treating petroleum oil. Such a gas is obtained from a contact process as generally used in acid manufacturing from sulphur or sulphur dioxide. It is also obtained from sulphur dioxide recovered as a by-product from coking acid sludge for its disposal or from the combustion of hydrogen sulphide. These gases are mixed with air, dried and passed over a catalyst such as vanadium pentoxide and yield a mixture of about 7% of $SO_3$ and 93% of inert gases. Such gases are normally absorbed in concentrated sulphuric acid to give oleum which is used where a high degree of treatment is required. According to this invention $SO_3$ can be used directly with greater economy. This is because the sulphuric acid present in oleum reacts only partly, but almost all of the $SO_3$ reacts in either case. The drawback of using $SO_3$ alone is the stiffness of the sludge obtained. This is due to the fact that it reacts more violently than oleum. Also the free unreacted sulphuric acid in oleum fluidizes or plasticizes the sludge.

In the treatment of petroleum with oleum the objective is to obtain a highly refined oil known commonly as while oil. There is also an alternative or secondary objective in some cases to obtain oil soluble sulfonate known as mahogany sulfonate. By the use of $SO_3$ instead of oleum the oil refining is carried out without the expenditure of excess sulphuric acid as a solvent to plasticize the sludge. It is also found that higher yields of mahogany sulfonate can be obtained with $SO_3$. This is because the volume of sludge produced is materially reduced over that obtained with oleum and the sludge is normally saturated with the mahogany sulfonic acids from which the sulfonate is obtained by neutralization. Therefore the lower the value of sludge, the less sulfonate is lost and the higher the yield. The process in this invention makes possible the use and control of $SO_3$ treating in a continuous process thereby economically achieving these ends. The direct application of $SO_3$ for treating oil leads to the formation of an extremely heavy sludge which coats the interior of the vessel and must be removed by mechanical scraping. One object of this invention is to modify this reaction and obtain a fluid sludge which flows continuously from the vessel thereby making periodic shutdowns and extensive hand labor unnecessary. The amount of treating that can be carried out in one stage is limited normally by the temperature of reaction. Above this limit the reaction mixture is excessively hot and secondary decomposition takes place. Then the sludge breaks down giving oil soluble impurities which redissolve in the oil being refined. This opposes the desired process giving an inferior product, lower yields and renders the sludge harder than normal. The process of this invention makes it possible to treat in any given stage to the optimum point of oil purity or sulfonic acid concentration in the oil and to do so at an optimum temperature with fluid sludge. Too low a temperature affects adversely the solubility of the sulfonic acid in the oil phase and a large part of it is lost in the sludge. Therefore it is necessary to maintain the reaction at a moderately elevated temperature, say between 50° C. and 100° C. preferably at 70° C. in order to produce the highest possible yield of mahogany sulfonate in the oil and to have it free from sludge decomposition products giving poor color.

In treating with oleum to make white oil, the operation is broken up into a series of stages. The mahogany sulfonate is obtained principally by alcohol washing the oil at one of the intermediate stages.

The formation of excessively stiff sludge during the first part of the acid treating process is due to the oxidation and polymerization of certain highly unsaturated materials in the oil. These materials contain complex rings and side chains and can be sulfonated to give fluid products only at low temperatures. At ordinary treating temperatures where the refining function of the acid is best utilized, it is found that oxidation, polymerization and sulfonation all occur simultaneously. Under these conditions these are highly condensed products produced from the most highly unsaturated materials in the oil. These solid products are known as acid coke. In the normal treating sludge the acid coke in the sludge exerts a marked stiffening effect but is fluxed by the free and unreacted acid present. As the acid treating process proceeds to the later stages the readily condensible high unsaturates have been removed and the simpler sulfonated sludge product is quite fluid. In SO₃ treating this effect is tremendously exaggerated with the result that preliminary treats make a solid sludge which is mostly acid coke. Ordinarily in white oil treating the removal of the oil soluble sulfonate occurs after the treating has reached an intermediate stage. The severe coking occurs only in the first part of the preliminary treating to the sulfonate removal. It has been discovered that the acid coke is obtained in a fluxed state if the treating is carried out in the presence of a large excess of partly refined oil which does not contain the highly unsaturate materials which produce the coke. This is due in part to the solvent properties of the liquid sulfonic acids formed from the partly refined oil. It is also due to some extent to the fact that dilution of the highly unsaturated materials moderates the reaction of the SO₃ on these materials so that it more closely approaches the type of direct sulfonation occurring at reduced temperatures. Lubricating oils having a Saybolt viscosity at 100° F. of less than 50 seconds generally do not contain these highly reactive unsaturated hydrocarbons. On the other hand, oils having Saybolt viscosities from about 70 seconds at 100° F. and upward are preferably treated according to this process with sulphur trioxide. It is possible to reduce the highly unsaturated hydrocarbons in the lubricating oils by solvent extraction, but this method has not been found economical.

Other objects are to provide a method where temperature of the process can be adequately controlled and a more intimate contact of the treating agent and the oil is obtained.

These and other objects of the invention will be readily seen on reading the following description with reference to the accompanying drawing which diagrammatically shows the flow plan used according to this method. Referring to the drawing, a treating tower 1 is provided in the upper part of which is passed by means of pipe 2, a petroleum oil distillate having a Saybolt Universal viscosity at 100° F. of 350–380 seconds. This oil is given as an example for other oils of higher and lower viscosity which may be treated. On pipe 1 is provided a heat exchanger 3 to control the temperature of the oil passing into the reactor 1. In the lower part of the reactor 1 is passed by means of pipe 4 a stream of gaseous sulfur trioxide which passes in countercurrent flow to the oil passing from the top of the reactor to the bottom of the reactor. The proportions of oil to sulfur trioxide used are about 6 cu. ft. of the sulfur trioxide to each gallon of the oil. The reactor may be a packed reactor or a reactor in which other suitable means are used to obtain a better contact. Effluent gases will be taken from the top of the reactor by means of pipe 5 and returned to a furnace to avoid air pollution. The resulting acid or sludge emulsion formed will flow continuously by gravity through pipe 6 to a closed settler 7. Sludge is withdrawn continuously from the settler by means of pipe 8 provided with valve 9. A portion of the oil is recycled through pipe 10 provided with valve 11 and pump 12 to the oil feed line 2 in the proportion of one part of the recycled acid oil to one part of an oil feed flowing into pipe 2 by means of pipe 13. This proportion may be varied from 1:5 to 10:1. The remaining part of the acid oil is passed through pipe 14 provided with valves 15, 16 and 18 to pipe 19 and mixing chamber 20. Any gas accumulating in the system is removed into pipe 21. Into mixing chamber 20 is added a neutralizing agent such as caustic soda or other alkali and a 50% solution of alcohols such as ethyl or isopropyl. Sufficient alkali is used to neutralize the acid oil. The mixture of acid oil and alcohol solution of the sulfonates is passed through 22 to settler 23 where the alcoholic solution of sulfonates is removed continuously by means of pipe 24 provided with valve 25. It may sometimes be desirable to filter the acid oil before neutralization in order to remove the so-called pepper sludge. This is generally done by adding a filter aid and then passing through a filtering unit. The separated acid oil is then passed from settler 23 through pipe 26 or to washing chamber 27 where the oil may be further washed to remove any residual sulfonates. The oil is then passed through pipe 28 by means of pump 29 to stripping tower 30. The intermediate section of said stripping tower 30 is provided with a steam spray 31 to heat the oil and in the bottom of the stripping tower 30 is an inlet for air. The oil is there heated and stripped and dried by steam and air and any alcohol that had remained dissolved in the oil is removed through pipe 33, passed through condenser 34 and enters storage by means of pipe 35. The oil free of acid and alcohol is then passed through pipe 36 to reactor 37 which is similar to reactor 1 and into the bottom of reactor 37 is passed sulfur trioxide by means of pipe 38. The effluent gas is removed through pipe 39 and the acid oil is removed through pipe 42 to settler 41 where sludge that settles out is removed through pipe 42 and if desired a portion

| Treat No | 1 | 2 | 3 | 3 treats |
|---|---|---|---|---|
| Total Treating period, Hrs | 7½ | 6 | 3¾ | |
| Intermediate Oil Feed Rate Gallons per Hours | | | | |
| $SO_3$ Stream Flow Rate, CFH Cubic feet per hour | | 7.05 | | |
| $SO_3$ Content, gms./cu.ft | 376 | 372 | 370 | |
| Treat, gms. $SO_3$/100 cc. Intermediate Oil | 6.01 | 6.08 | 5.35 | |
| Treat, Equiv. Oleum, vol. per cent | 8.47 | 8.48 | 7.42 | |
| Total Intermediate Feed, gals | 4.04 | 3.93 | 1 3.34 | |
| Yields, vol. per cent: | 52.9 | 42.3 | 26.4 | |
| Acid Oil | 95.7 | 96.7 | 96.6 | |
| Sluge | 5.1 | 3.1 | 4.2 | |
| Acid Oil+Sludge | 100.8 | 99.8 | 100.8 | |
| Neutral Oil Inspection: | | | | |
| Hot Acid Test | | | | |
| Color, Saybolt | 10+ 20 (TR) | 9.1 +19 | 9.6 +19 | 2-3 +15 to +30 |
| Vis. Standard Saybolt at 100° F | 369 | 364 | 354 | 360-370 |
| Sp. Gr. at 60° F | 0.8831 | 0.8808 | 0.8814 | 0.880-0.883 |

1 Total Oleum=11.3 vol. per cent.

of the oil may be recycled to pipe 36 although in most cases, it is not necessary to recycle the acid oil for the sludge there formed is of low viscosity and will readily flow from the settler 41. The acid oil is then passed through pipe 43 provided with valves 44, 45, 46, 47 and 48 to mixing chamber 49 where an alkali neutralizing agent is added and a 50% solution of alcohol. The mixture of neutralized sulfonates and oil is then passed through pipe 50 to settler 51 from which sulfonates are removed by means of pipe 52 and the oil by means of pipe 53 to washing chamber 54. The washed solution is removed by means of pipe 55 and the neutral oil passed by means of pump 56 through pipe 57 through stripping tower 58 where it is heated by means of steam provided by spray 59 and blown with air provided with pipe 60. The separated alcohol is removed through pipe 61 and passed through condenser 62 and enters storage by means of pipe 63. The finished product oil is then removed by means of pipe 64.

A plurality of feed steps is found necessary where the yield of sulfonate obtained as a by-product in the first treating step is a maximum at a given degree of treatment.

The following table shows the effects of treating time on a petroleum oil having a viscosity of 500 seconds Saybolt at 100° F. The $SO_3$ dosage is compared with oleum which effects a similar treatment, but less economically. The product in each case is a technical white oil.

The following is claimed:

1. Process for the treatment of petroleum distillates containing sulphur trioxide reactive constituents which comprises contacting said petroleum distillates in a series of consecutive treating stages with a gas comprising sulphur trioxide, adding to said petroleum distillates fed to the first stage an oil substantially free from sulphur trioxide reactive constituents before treatment with the sulphur trioxide in said first stage, removing the acid oil and sludge from said first stage and separating a fluid sludge from the acid oil, neutralizing said acid oil and further treating the neutralized oil with additional sulphur trioxide in a subsequent stage.

2. Process as defined by claim 1 wherein said gas comprises about 7% sulphur trioxide and about 93% inert gas.

FRANCIS M. ARCHIBALD.

REFERENCES CITED

The following references are of record in the file of this patent:

UNITED STATES PATENTS

| Number | Name | Date |
|---|---|---|
| 1,387,835 | Cobb | Aug. 16, 1921 |
| 1,785,270 | Lavirotte | Dec. 16, 1930 |
| 2,121,167 | Franklin | June 21, 1938 |
| 2,261,206 | Archibald | Nov. 4, 1941 |
| 2,264,904 | Lemmon et al. | Dec. 2, 1941 |
| 2,294,884 | Archibald | Sept. 8, 1942 |